United States Patent
Snider

(10) Patent No.: US 10,366,474 B2
(45) Date of Patent: Jul. 30, 2019

(54) PIECEWISE SMOOTH REGULARIZATION OF DATA

(71) Applicant: Hewlett Packard Enterprise Development LP, Houston, TX (US)

(72) Inventor: Gregory Stuart Snider, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/318,446

(22) PCT Filed: Jun. 30, 2014

(86) PCT No.: PCT/US2014/044887
§ 371 (c)(1),
(2) Date: Dec. 13, 2016

(87) PCT Pub. No.: WO2016/003416
PCT Pub. Date: Jan. 7, 2016

(65) Prior Publication Data
US 2017/0148143 A1    May 25, 2017

(51) Int. Cl.
*G06T 5/00* (2006.01)
*G06T 7/20* (2017.01)
(Continued)

(52) U.S. Cl.
CPC .......... *G06T 5/002* (2013.01); *G06T 3/4007* (2013.01); *G06T 5/20* (2013.01); *G06T 7/20* (2013.01);
(Continued)

(58) Field of Classification Search
CPC ......... G06T 5/002; G06T 5/20; G06T 3/4007; G06T 2207/10016; G06T 2207/20192
See application file for complete search history.

(56) References Cited

U.S. PATENT DOCUMENTS

2008/0107351 A1   5/2008   Piovano et al.
2010/0310175 A1   12/2010  Holt
(Continued)

FOREIGN PATENT DOCUMENTS

AU    2011265340        7/2013
KR    10-28-0093110     10/2008
WO    WO-2014-095560    6/2014

OTHER PUBLICATIONS

He et al, "Guided Image Filtering", IEEE, 2013.*
(Continued)

*Primary Examiner* — Ruiping Li
(74) *Attorney, Agent, or Firm* — Hewlett Packard Enterprise Patent Department

(57) ABSTRACT

Piecewise smooth regularization of data is disclosed. One example is a system where input data is received, the input data being associated with a certainty function indicative of confidence of each data element in the input data. Guide data including information indicative of presumed piecewise smoothness of the input data is received. A joint edge-aware filter is applied, based on the guide data, to the input data to provide filtered data. The joint edge-aware filter is applied, based on the guide data, to the certainty function to provide filtered certainty. A normalized convolution algorithm is applied to the filtered data and the filtered certainty to provide output data indicative of a piecewise smooth regularization of the input data.

12 Claims, 5 Drawing Sheets

(51) Int. Cl.
G06T 3/40 (2006.01)
G06T 5/20 (2006.01)

(52) U.S. Cl.
CPC .............. G06T 2207/10016 (2013.01); G06T 2207/20192 (2013.01)

(56) References Cited

U.S. PATENT DOCUMENTS

2011/0181461 A1 7/2011 Sarkis
2011/0229029 A1 9/2011 Kass
2014/0119628 A1 5/2014 Elad et al.

OTHER PUBLICATIONS

Gastal et al, "Domain Transform for Edge-Aware Image and Video Processing", ACM, 2011.*
Kass, M. et al., "Smoothed Local Histogram Filters Pixar Technical Memo", Jun. 1, 2010, 10 pages.
Matakos, A. et al, "Accelerated Edge-preserving Image Restoration without Boundary Artifacts", Jan. 30, 2013, 25 pages.
Xiao et al., "Bilateral filtering-based optical flow estimation with occlusion detection", In Computer Vision—ECCV 2006, pp. 211-224.
Tomasi et al., "Bilateral filtering for gray and color images", Proceedings of the 1998 IEEE International Conference on Computer Vision, Bombay, India, Jan. 1998, pp. 839-846.
Pauwels et al., "Realtime phase-based optical flow on the GPU", In CVPR Workshops, Jun. 2008, pp. 1-8.
Paris et al., A fast approximation of the bilateral filter using a signal processing approach, In Computer Vision—ECCV 2006, pp. 568-580.
Marzat et al., "Real-time dense and accurate parallel optical flow using CUDA", In Proceedings of the 17th International Conference in Central Europeon Computer Graphics, Visualization and Computer Vision (WSCG'09), Feb. 2009, pp. 105-111.
Krahenbuhl et al., "Efficient nonlocal regularization for optical flow", In Computer Vision—ECCV 2012, pp. 356-369.
Knutsson et al., "Normalized and differential convolution", In Computer Vision and Pattern Recognition, Proceedings CVPR'93, IEEE Computer Society Conference on, Jun. 1993, pp. 515-523.
International Search Report and Written Opinion received for PCT application No. PCT/US2014/044887, dated Mar. 2, 2015, 8 pages.
International Preliminary Report on Patentability received for PCT Application No. PCT/US2014/044887, dated Jan. 12, 2017, 7 pages.
He at al., "Guided Image Filtering", Computer Vision—ECCV 2010, Lecture Notes in Computer Science, vol. 6311, 2010, 14 pages.
Farneback et al., "Two-frame motion estimation based on polynomial expansion", SCIA'03 Proceedings of the 13th Scandinavian conference on Image analysis, 2003, pp. 363-370.
Baker et al., "A Database and Evaluation Methodology for Optical Flow", International Journal of Computer Vision, vol. 92, No. 1, Mar. 2011, pp. 1-31, available online at < http://vision.middlebury.edu/flow/floweval-ijcv2011.pdf >.
Baker et al., "A Database and Evaluation Methodology for Optical Flow", In Proc. Eleventh IEEE International Conference on Computer Vision (ICCV 2007), Rio de Janeiro, Brazil, Oct. 2007, 8 pages.

* cited by examiner

PIECEWISE SMOOTH REGULARIZATION OF DATA

BACKGROUND

Data can include distortions that can make it fragmentary, uncertain, or noisy. Data analysis is utilized to remove such distortions. Regularization of data imposes prior constraints on the data to optimize a function associated with the data.

DETAILED DESCRIPTION

Figure 1:
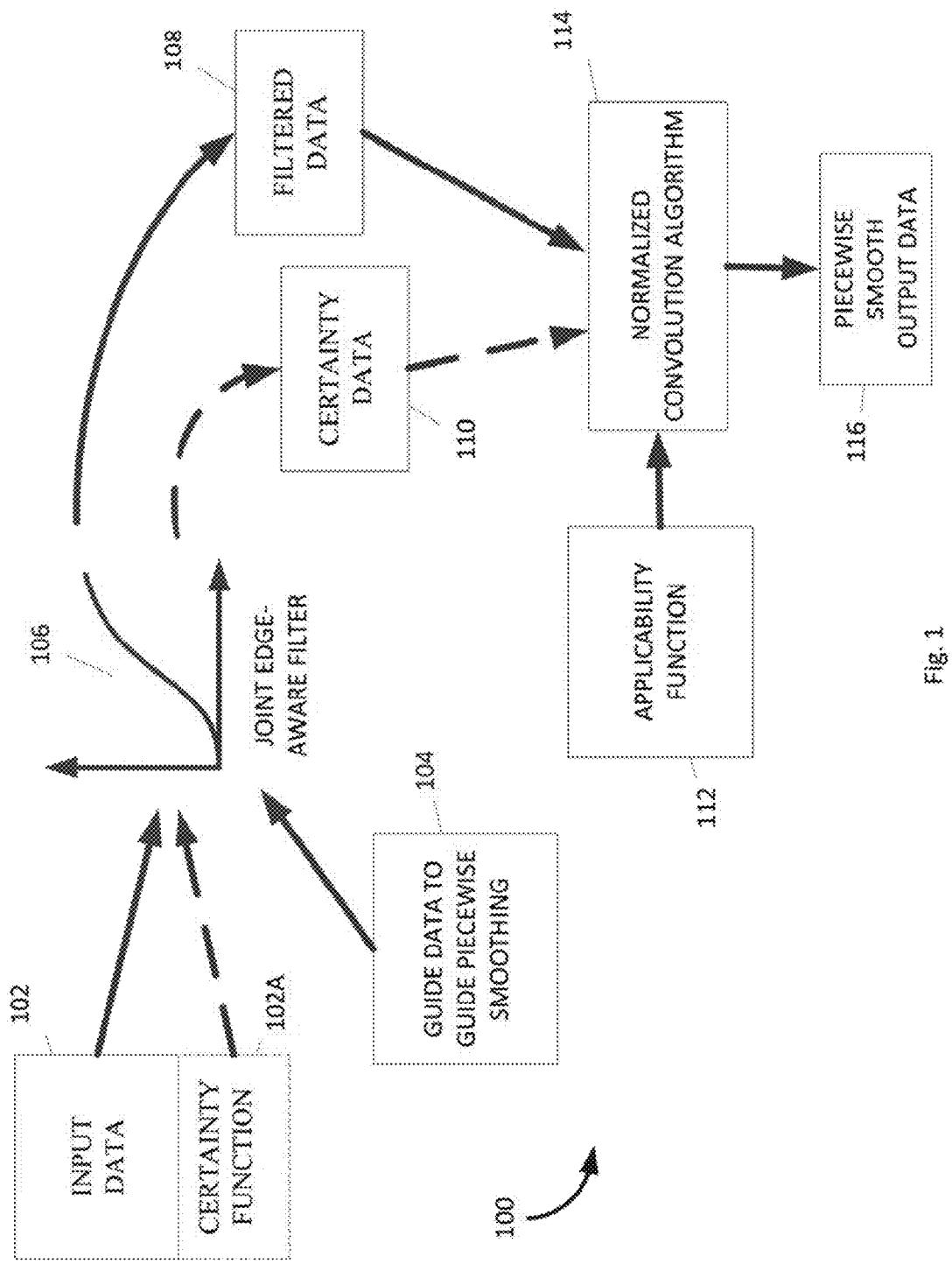
FIG. 1 is a functional block diagram illustrating one example of a system for piecewise smooth regularization of data.

Piecewise smooth regularization of data is disclosed. Data can include distortions that can make it fragmentary, uncertain, or noisy. Data analysis is utilized to remove such distortions. Regularization of data imposes prior constraints on the data to optimize a function associated with the data. Piecewise smoothness of data is a prior constraint that may be imposed in a variety of data analysis situations, including optimization of a multivariate function.

An optical flow analysis is an example of a technique that provides a solution to a multivariate function to be optimized. The optical flow analysis takes two or more sequential images from a video stream, and for each given image in the video stream, the technique creates a vector field that represents the velocity of each pixel in the first image. Video streams generally include rigid objects that follow simple geometric paths, such as straight and/or curved lines. In such an instance, the velocity of each pixel may change abruptly at the boundary of the rigid object, but change smoothly within the boundary of the rigid object. Accordingly, the vector field representing the optical flow may be assumed to be piecewise smooth.

As described in various examples herein, piecewise smooth regularization of data is performed in situations where the initial estimates of solutions are sparse. Generally, solutions to such regularization of data are achieved by balancing a data fidelity factor and a regularization factor. The data fidelity factor may be that the solution include certain initial conditions, including fidelity with the initial sparse estimates. The regularization factor may be, for example, that the solution be piecewise smooth. As described herein, two filtering techniques are applied to available data to find an approximate, non-iterative solution to a multivariate function to be optimized, where the solution trades off data fidelity and piecewise-smooth regularization. A joint edge-aware filter is utilized in combination with a normalized convolution algorithm. An edge-aware (or bilateral) filter is generally utilized to smooth objects in the initial estimate of the solution without softening the boundaries of such objects. The joint edge-aware filter utilizes the structure of a guide data to direct the smoothing of a second input data. If the guide data and input data are the same, the result is identical to that obtained by applying the edge-aware filter. The normalized convolution algorithm is an interpolation process to fill in missing or uncertain data in the initial estimate of the solution.

In one example, a combination of the normalized convolution algorithm and the joint edge-aware filter may be applied to input data to generate output data. The input data is received via a processing system, the input data being associated with a certainty function indicative of confidence of each data element in the input data. Guide data is received via the processing system, where the guide data includes information indicative of piecewise smoothness of the input data. A joint edge-aware filter provides piecewise smoothing of the input data and the certainty function, the joint edge-aware filter being applied via the processing system. The joint edge-aware filter is first applied to the input data based on the guide data to provide filtered data, the filtered data being indicative of the piecewise smoothness of the input data. The joint edge-aware filter is then applied to the certainty function based on the guide data to provide filtered certainty, the filtered certainty being indicative of piecewise smoothness of the certainty function. A normalized convolution algorithm is applied, via the processing system, to the filtered data and the filtered certainty to provide the output data, the output data being indicative of a piecewise smooth regularization of the input data.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for piecewise smooth regularization of data. The system 100 receives input data, the input data being associated with a certainty function indicative of confidence of each data element in the input data. Guide data is received via the processing system, the guide data including information indicative of piecewise smoothness of the input data. Based on the guide data, the input data is processed by a joint edge-aware filter to provide filtered data. The certainty function is processed by the joint edge-aware filter, based on the guide data, to provide filtered certainty. A normalized convolution algorithm is applied to the filtered data and the filtered certainty to provide output data indicative of a piecewise smooth regularization of the input data.

System 100 includes input data 102 associated with a certainty function 102A, guide data 104, a joint edge-aware filter 106, filtered data 108, filtered certainty 110, a normalized convolution algorithm 114, and output data 116. In one example, system 100 includes an applicability function 112. Input data 102 comprises of a plurality of data elements. In one example, the input data 102 may be associated with an input data function to be optimized based on the input data 102. In one example, the input data function associated with input data 102 may be a multivariate function to be optimized under a piecewise smooth constraint. For example, an optical flow analysis takes two or more sequential images from a video stream, and for each given image in the video stream, the technique creates a vector field that represents the velocity of each pixel in the given image. In this example, the input data function represents an initial estimate of the velocity vector of each pixel in the optical flow.

Input data 102 is associated with a certainty function 102A. The certainty function 102A is indicative of confidence of each data element in the input data. In one example, where the input data function associated with the input data is a multivariate function to be optimized under a piecewise smooth constraint, the certainty function may be a scalar field acting on each data element in the dataset. In one example, the input data may be an image, and each data point may be a pixel, and the certainty function may be indicative of an image quality of each pixel of the image. For example, the image may include known bad pixels. In such a case, the certainty function would carry a value of 0 for the bad pixels to indicate complete uncertainty (or very low confidence), and a value of 1 for good pixels to indicate complete certainty (or very high confidence). For the example of optical flow, the initial velocity estimate is certain for a small number of the pixels in the image, so the certainty function would carry a value of 1 for the small number of pixels where the initial estimated velocity is certain. Intermediate values of certainty function between 0 and 1 may also be utilized.

In one example, input data 102 includes at least one data element with a certainty function value indicative of low confidence. For example, where the input data is an image, the image may include at least one bad pixel. For another example, an optical flow analysis may contain at least one pixel where an initial velocity is not possible due to a lack of local structure or texture. Accordingly, the certainty function assigned to the bad or uncertain pixel may be 0, indicative of low confidence.

System 100 includes guide data 104 including information indicative of piecewise smoothness of the input data. In one example, where the input data represents the vector field showing the velocity of each pixel between temporally adjacent images in the video stream, the objects in the image may be assumed to be rigid and the velocity vector may be assumed to be smooth within the boundary of the object, and change abruptly at the boundaries. Accordingly, the first image in a sequence of images undergoing analysis may be used as guide data that is indicative of piecewise smoothness of the input data.

Input data 102 and certainty function 102A are both filtered via the joint edge-aware filter 106 based on the guide data 104. Generally, a bilateral or edge-aware filter is used to smooth input data without softening edges of objects represented in the input data. The joint edge-aware filter 106 utilizes the structure of the guide data 104 to direct the smoothing of the input data 102 to provide filtered data 108. If the guide data 104 and the input data 102 are the same, the result is identical to the output of a bilateral or edge-aware filter. In one example, the joint edge-aware filter 106 may utilize the structure of a guide image to direct the smoothing of an input image. For example, in an optical flow algorithm, the joint edge-aware filter 106 may allow the velocity field to spread out within homogeneous regions specified by the guide data 104.

The joint edge-aware filter 106 also utilizes the structure of the guide data 104 to direct the smoothing of the certainty function 102A to provide filtered certainty 110. In one example, the joint edge-aware filter 106 may utilize the structure of a guide image to direct the smoothing of the certainty function. For example, in an optical flow algorithm, the image may include pixels for which an initial velocity estimate is not possible, typically due to a lack of local structure or texture. In such a case, the certainty function may carry a value of 0 for the pixels lacking a certain velocity estimate, and a value of 1 for pixels where the initial velocity estimate is considered reliable. The joint edge-aware filter 106 may allow the values of 0 and 1 to spread out within homogeneous regions specified by the guide data 104.

In one example, the joint edge-aware filter 106 provides piecewise smoothing of the input data based on local information at each data element. In one example, the joint edge-aware filter 106 provides piecewise smoothing of the input data based on a spatial/intensity measure of each data element in the input data, where the spatial/intensity measure is indicative of a maximal spatial extent of the piecewise smoothing at each data element along with a maximal difference in intensity between a given pixel and those pixels in its immediate neighborhood. For example, when the input data 102 is an image, the spatial/intensity measure for a given pixel may be based on values (e.g. intensity) of pixels that are proximate to the given pixel. Values of pixels close to the given pixel may be weighed more heavily than the values of pixels that are far away, and pixels close in intensity to the given pixel may be weighted more heavily than pixels with very different intensity, even when those pixels are close to the given pixel. Thus both spatial locality and intensity (or color) similarity are used to weight the smoothing.

In one example, system 100 includes an applicability function 112 associated with the input data, the applicability function 112 indicative of how the input data may be interpolated. In one example, the certainty function value of the at least one data element may be indicative of low confidence. In one example, the applicability function 112 associates a weight with each given data element in the input data, the weight being inversely proportional to a distance of the given data element from the at least one data element. For example, the applicability function 112 may be an isotropic function, such as a Gaussian, that weighs pixels close to an uncertain pixel more heavily than those that are further away.

The normalized convolution algorithm 114 is applied to the filtered data 108 and the filtered certainty 110 to generate the output data 116, where the output data 116 is indicative of a piecewise smooth regularization of the input data 102 based on the certainty function 102A. In one example, the normalized convolution algorithm 114 is applied based on the applicability function 112. The normalized convolution algorithm may be utilized as an interpolation process to fill in data elements with a low confidence in the input data 102.

Normalized convolution may be implemented as $$\frac{f*a}{c*a}$$

where f is a function or data set being interpolated, a is the applicability function, c is the certainty function, and * represents a convolution operator.

In one example, system 100 may implement the combination of the joint edge-aware filter 106 and the normalized convolution algorithm 114 via the following set of operations:

Image=Input Data×Certainty Function where the input data is a vector field and this vector field is multiplied pointwise by the certainty function which is a scalar field.

Filtered Data = Joint edge aware Filter(Guide Data, Image)

Filtered Certainty =

Joint edge aware Filter(Guide Data, Certainty Function)

$$\text{Output Data} = \frac{\text{Filtered Data}}{\text{Filtered Certainty} + C},$$

where C is a small constant that prevents division by zero. Note that this algorithm combines both joint, edge-aware filtering with a normalized convolution algorithm. The last operation implements the normalized convolution, interpolating data elements with a low confidence but not the data elements with a high confidence.

Figure 2A:
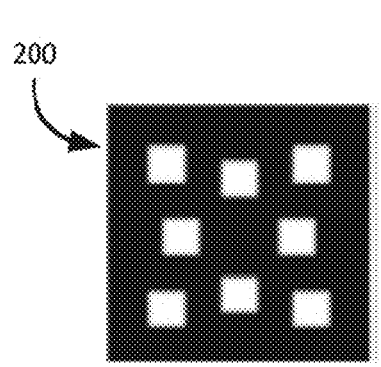
FIGS. 2A-2C illustrate one example of piecewise smooth regularization of image data in an optical flow algorithm.
Figure 2B:
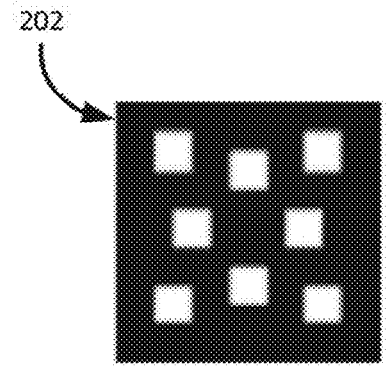
Figure 2C:
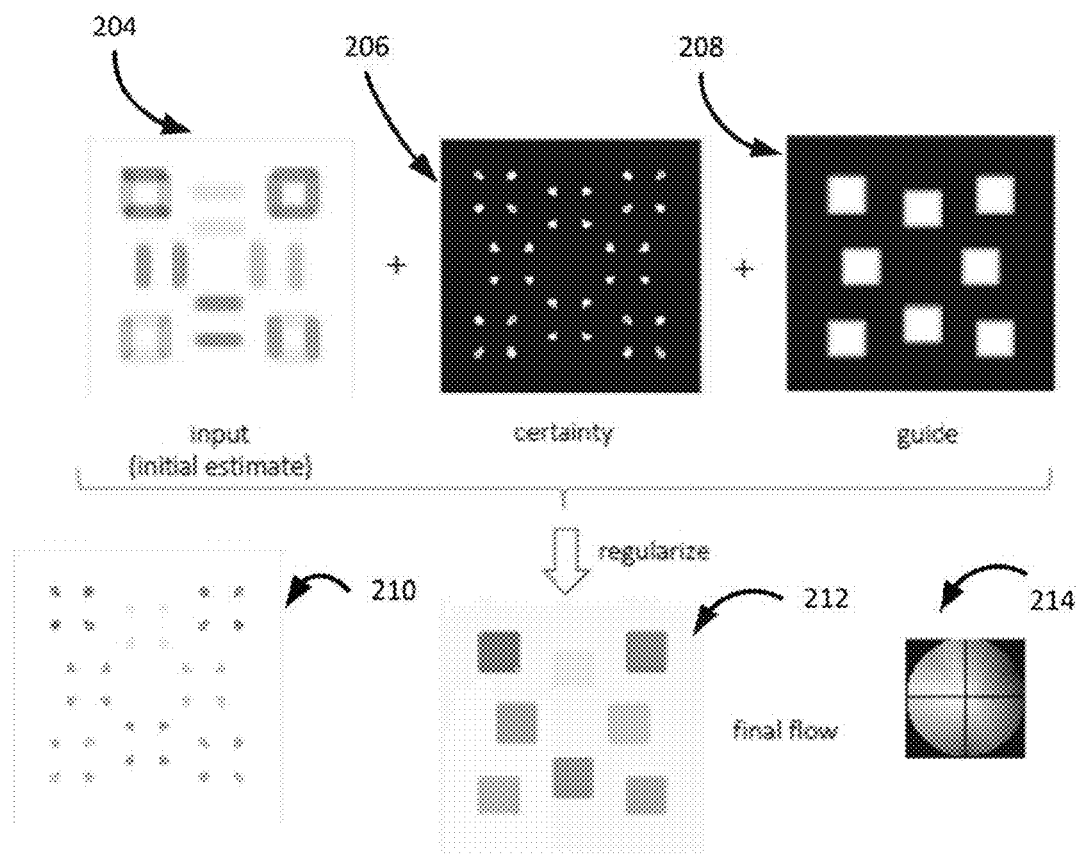

FIGS. 2A-2C illustrate one example of piecewise smooth regularization of image data in an optical flow algorithm. FIG. 2A illustrates a first frame 200 in the optical flow analysis, and FIG. 2B illustrates a second frame 202 in the optical flow analysis. The initial flow analysis 204 in FIG. 2C is a vector field showing the velocity as a vector at each point in the first frame 200. The FIG. 204 encodes velocity with a grayscale code 214, with the hue representing direction and hue saturation representing vector length (i.e., speed). The vector at a given pixel shows the velocity of that pixel in the first frame 200. Following the direction and magnitude of the vector at a given pixel yields the location in the second frame 202 where the given pixel winds up. In this example, all white squares in frame 200 move one unit in either the horizontal direction or vertical direction or both, resulting in frame 202. So all vectors in this example have length 1 or length 1.414214.

Certainty 206 in FIG. 2C is a scalar field showing the certainty of the initial flow analysis 204 at each point frame 200. A value of 1, shown as white, means a high level of confidence, and a value of 0, shown as black, means a low level of confidence. The first frame 200 may be used as guide data, based on an assumption that the objects in the first frame 200 are rigid and that velocities in the first frame 200 are piecewise smooth, changing rapidly at the edges of the objects.

The input data is the initial flow analysis 204, and the certainty function is the certainty 206. The spatial measure and range measure are parameters that represent a balance between data fidelity (e.g. initial flow analysis 204 where certainty is high) and adherence to the regularization objectives (e.g., piecewise smooth constraint).

In one example, the regularization may be performed as follows: the initial flow analysis 204 is multiplied, point by point, with the scalar field certainty 206. This discards everything but the certain data, yielding the image 210 representing the flows in frame 200 which are certain. The image 210 is filtered with a joint edge aware filter using the first frame 200 as the guide data 208.

This allows the velocity field to spread out within homogeneous regions specified by the guide data 208. This produces the filtered data. The certainty 206 is also filtered with a joint edge aware filter using the guide data 208. This allows the certainty field to spread out within homogeneous regions specified by the guide data 208. This produces the filtered certainty. The quotient (filtered data/filtered certainty+C) is computed. This is analogous to a normalized convolution that interpolates regions of uncertainty but not regions of certainty. In this example, the certain region is sparse. But because of the joint edge-aware filtering steps, this normalized convolution techniques incorporates the piecewise smooth regularization constraint. The small constant in the quotient prevents division by zero. The piecewise smooth output data is the final flow 212.

Figure 3:
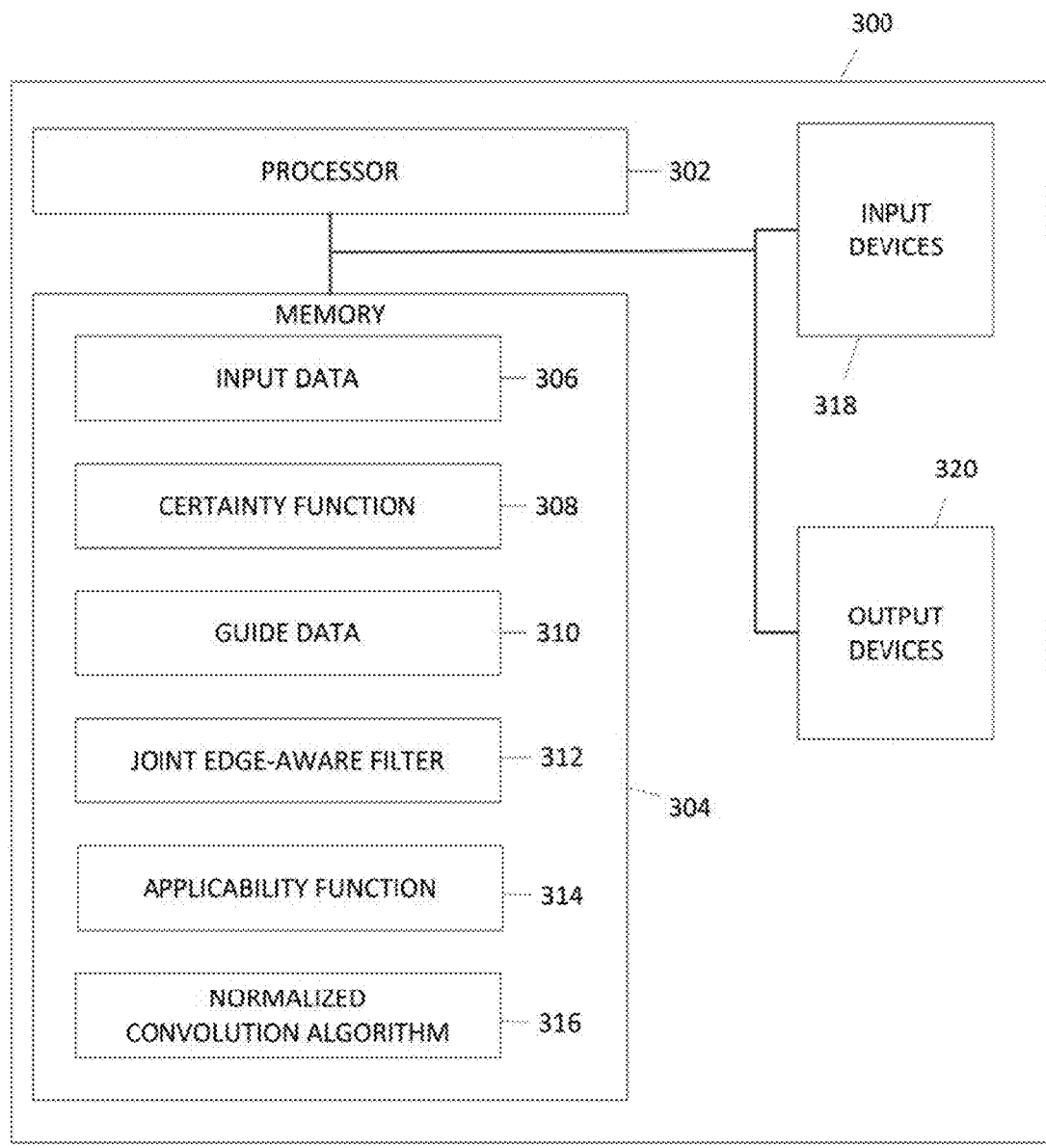
FIG. 3 is a block diagram illustrating one example of a processing system for implementing the system for piecewise smooth regularization of data.

FIG. 3 is a block diagram illustrating one example of a processing system 300 for implementing the system 100 for piecewise smooth regularization of data. Processing system 300 includes a processor 302, a memory 304, input devices 318, and output devices 320. Processor 302, memory 304, input devices 318, and output devices 320 are coupled to each other through communication link (e.g., a bus).

Processor 302 includes a Central Processing Unit (CPU) or another suitable processor. In one example, memory 304 stores machine readable instructions executed by processor 302 for operating processing system 300. Memory 304 includes any suitable combination of volatile and/or non-volatile memory, such as combinations of Random Access Memory (RAM), Read-Only Memory (ROM), flash memory, and/or other suitable memory.

Memory 304 stores input data 306 for processing by processing system 300. In one example, memory 304 stores input data and an associated multivariate function to be optimized under a piecewise smooth constraint for processing by processing system 300. Memory 304 stores certainty function 308, guide data 310, and applicability function 314 for processing by processing system 300. In one example, applicability function 314 for the input data is indicative of how the certainty function may be interpolated. In one example, the applicability function 314 specifies a convolutional filter used to interpolate uncertain pixels using data from certain pixels. Such a filter will typically weight nearby pixels more heavily than distant pixels, for example, with weight being inversely proportional to a distance of the given data element from a first data element, or with a Gaussian or other isotropic function. Memory 304 also stores instructions to be executed by processor 302 including instructions for a joint edge-aware filter 312, and a normalized convolution algorithm 316, which in this case is just the division of the results of the joint edge-aware filter applied to the input data and to the input certainty function, as previously described and illustrated with reference to FIG. 1.

In one example, processor 302 utilizes the guide data 310 and executes instructions of joint edge-aware filter 312 to filter input data 306 to provide filtered data. Processor 302 also utilizes the guide data 310 and executes instructions of joint edge-aware filter 312 to filter certainty function 308 to provide filtered certainty.

In one example, the processor 302 utilizes the guide data 310, and local information at each data element, and executes instructions of joint edge-aware filter 312 to provide piecewise smoothing of the input data. In one example, processor 302 executes instructions of joint edge-aware filter 312 to provide piecewise smoothing of the input data based on a spatial/intensity measure of each data element in the input data, where the spatial/intensity measure is indicative of a maximal spatial extent of the piecewise smoothing and maximal intensity or range extent at each data element. In one example, processor 302 executes instructions of joint edge-aware filter 312 to provide piecewise smoothing of the input data based on both a spatial and a range measure, where the range measure is a heuristic intended to prevent smoothing across object boundaries in the input data.

Processor 302 utilizes applicability function 314 to execute instructions of a normalized convolution algorithm 316 to the filtered data and the filtered certainty to provide the piecewise smooth output data. This algorithm divides the output of the joint edge aware filter applied to the input data by the output of the joint edge aware filter applied to the certainty data (with a small constant added in the denominator to prevent division by zero).

Input devices 318 include a keyboard, mouse, data ports, and/or other suitable devices for inputting information into processing system 300. In one example, input devices 318 are used to input feedback from users for evaluating the input data 302, certainty function 304, guide data 310, applicability function 314, the small constant C to be used in the normalized convolution algorithm 316, the spatial measure, and/or the range measure. Output devices 320 include a monitor, speakers, data ports, and/or other suitable devices for outputting information from processing system 300. In one example, output devices 320 are used to output the piecewise smooth output data. In one example, input data 306 is received via input devices 318. The processor 302 regularizes the input data 306, and provides the output data via output devices 320.

Figure 4:
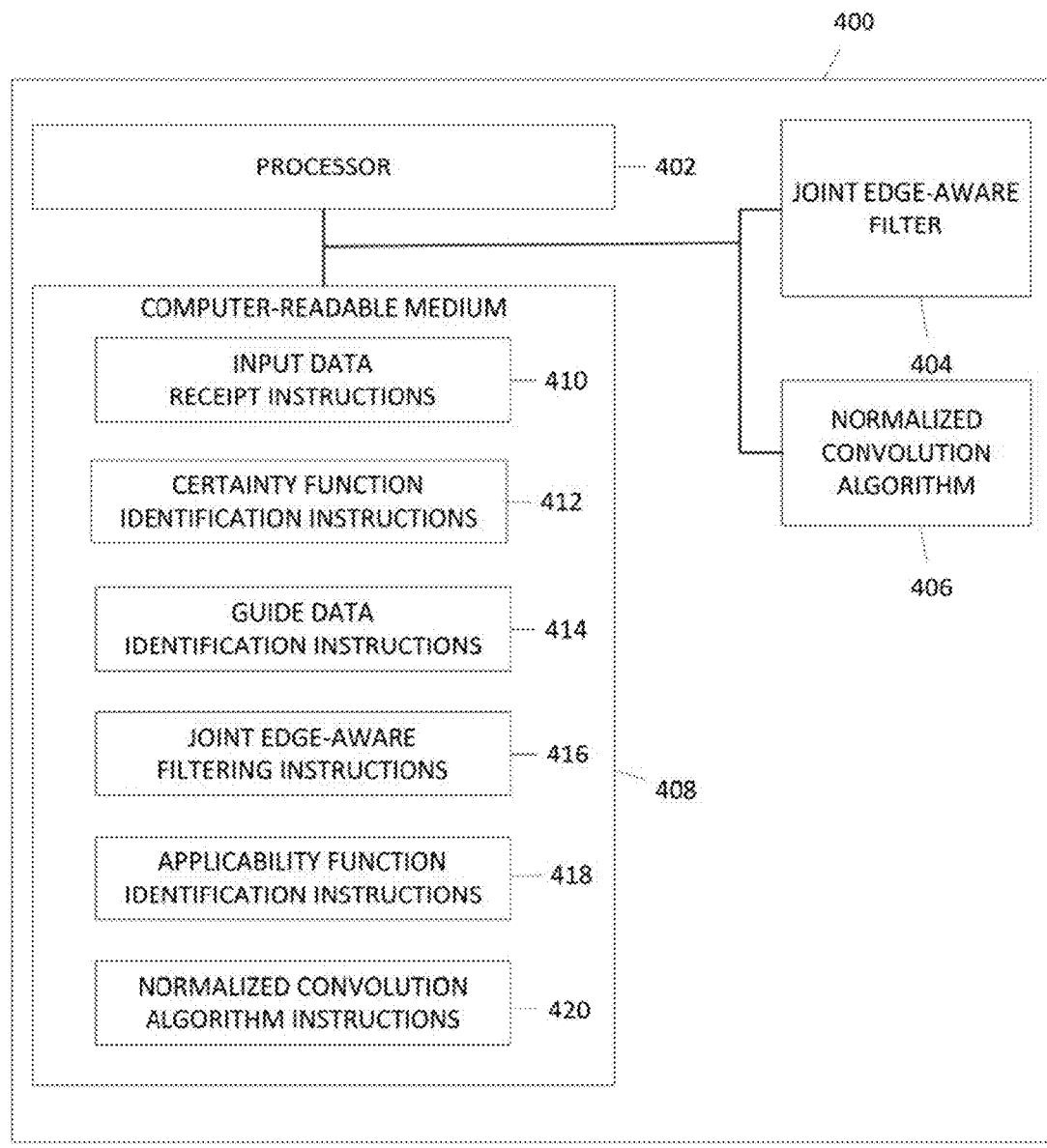
FIG. 4 is a block diagram illustrating one example of a computer readable medium for piecewise smooth regularization of data.

FIG. 4 is a block diagram illustrating one example of a computer readable medium for functional summarization of non-textual content based on a meta-algorithmic pattern. Processing system 400 includes a processor 402, a computer readable medium 408, a joint edge-aware filter 404, and a normalized convolution algorithm 406. Processor 402, computer readable medium 408, the joint edge-aware filter 404, and the normalized convolution algorithm 406 are coupled to each other through communication link (e.g., a bus).

Processor 402 executes instructions included in the computer readable medium 408. Computer readable medium 408 includes input data receipt instructions 410 to receive input data. Computer readable medium 408 includes certainty function identification instructions 412 to identify the certainty function associated with the input data. In one example, computer readable medium 408 includes the input data receipt instructions and input data function identification instructions, where the input data function is a multivariate function to be optimized under a piecewise smooth constraint, and the certainty function is a scalar field acting on each data element in the dataset. In one example, computer readable medium 408 includes at least one data element with a certainty function value indicative of low confidence. For example, where the input data is an image, the image may include at least one bad pixel. Accordingly, the certainty function assigned to the bad pixel may be 0, indicative of low confidence.

Computer readable medium 408 includes guide data identification instructions 414 to identify the guide data. Computer readable medium 408 includes joint edge-aware filtering instructions 416 of the joint edge-aware filter 404 to filter the input data based on the guide data to provide the filtered data. Computer readable medium 408 includes joint edge-aware filtering instructions 416 of the joint edge-aware filter 404 to filter the certainty function based on the guide data to provide the filtered certainty. Computer readable medium 408 includes applicability function identification instructions 418 to identify the applicability function. Computer readable medium 408 includes normalized convolution algorithm instructions 420 of the normalized convolution algorithm 406 to filter the filtered data and the filtered certainty based on the applicability function to generate the output data. In one example, computer readable medium 408 includes output data provision instructions to provide the output data.

Figure 5:
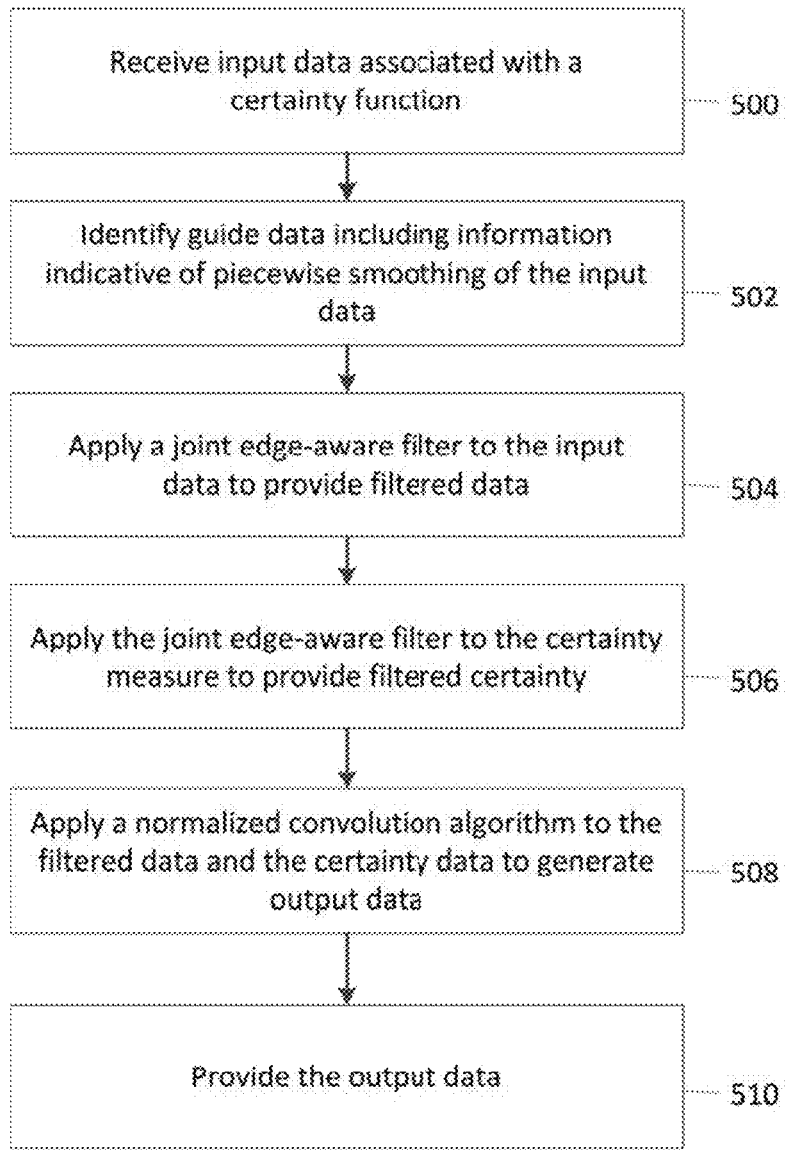
FIG. 5 is a flow diagram illustrating one example of a method for piecewise smooth regularization of data.

FIG. 5 is a flow diagram illustrating one example of a method for functional summarization of non-textual content based on a meta-algorithmic pattern. At 500, input data associated with a certainty function is received. At 502, guide data is identified, the guide data including information indicative of piecewise smoothing of the input data. At 504, a joint edge-aware filter is applied to the input data to provide filtered data. At 506, the joint edge-aware filter is applied to the certainty function to provide filtered certainty. At 508, a normalized convolution algorithm is applied to the filtered data and the certainty data to generate output data. At 512, the output data is provided.

In one example, the normalized convolution algorithm is applied based on an applicability function for the input data, the applicability function being indicative of how the input data function may be interpolated. In one example, the applicability function may weight pixels closer to a given pixel more highly than pixels that are further away.

In one example, the joint edge-aware filter may provide piecewise smoothing of the input data based on a spatial/intensity measure of each data element in the input data, the spatial measure being indicative of proportional spatial extent of the piecewise smoothing at each data element, and the intensity measure a measure or proportional intensity differences in pixels In one example, the input data function may be a multivariate function to be optimized under a piecewise smooth constraint, and the certainty function may be a scalar field acting on each data element in the dataset.

In one example, the input data may be an image, and the data point may be a pixel, and the certainty function may be a second image where each pixel represents the certainty of each pixel of the first image.

Examples of the disclosure provide a generalized system for using a combination of a joint edge-aware filter and a normalized convolution algorithm to regularize data subject to a piecewise smoothing constraint. The generalized system provides a filter-based, automatable approach to piecewise smooth regularization of data and is applicable, for example, to initial estimates of a solution to a multivariate function to be optimized, where the initial estimates of the solutions are sparse, and dominated by large regions of uncertainty or ambiguity. The generalized system is non-iterative, and is therefore computationally lighter than iterative optimization techniques. The edge-aware filter may be parallelized, and the computational complexity of the edge-aware filter may not depend on the spatial measure and the range measure, for example, by using domain transform filtering.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a processor;
a storage device storing code executable by the processor, and storing:
a first image frame of video data and a second image frame successive to the first image frame within the video data;
input data, the processor generating the input data that the storage device stores by executing the code to perform an optical flow technique on the first frame and the second frame, the input data generated by the processor being an initial flow analysis of the performed optical flow technique, and associated with a certainty function indicative of a confidence of the initial flow analysis for each data element of the first frame and with an input data function representing a velocity vector of each pixel in an optical flow; and guide data including information indicative of piecewise smoothing of the input data, the guide data being the first image, frame wherein the processor is configured to:

apply a joint edge-aware filter, by executing the code, to:

the input data generated by the processor, based on the guide data to provide filtered data, the filtered data indicative of the piecewise smoothing of the input data, and the certainty function based on the guide data to provide filtered certainty, the filtered certainty indicative of piecewise smoothing of the certainty function; and apply a normalized convolution technique, by executing the code, to the filtered data and the filtered certainty to provide output data indicative of a piecewise smooth regularization of the input data, the output data being a final flow analysis of the first frame.

2. The system of claim 1, wherein the input data function is optimized based on the input data.

3. The system of claim 2, wherein the normalized convolution technique is applied based on an applicability function for the input data, the applicability function indicative of how the input data function may be interpolated.

4. The system of claim 2, wherein the input data function is a multivariate function to be optimized under a piecewise smooth constraint, and the certainty function is a scalar field acting on each data element in the dataset.

5. The system of claim 1, wherein the input data is an image, and the data point is a pixel, and the certainty function is an image representation of certainty of each pixel of the image.

6. A method to apply piecewise smooth regularization of data, the method comprising:

performing, by a processor, an optical flow technique on a first image frame of video data and a second image frame successive to the first image frame within the video data to generate an initial flow analysis associated with a certainty function indicative of a confidence of the initial flow analysis for each data element of the first frame and associated with an input data function representing a velocity vector of each pixel in an optical flow;

identifying, by the processor, guide data, wherein the guide data includes information indicative of piecewise smoothness of the input data, the guide data identified as the first frame;

applying, by the processor, a joint edge-aware filter to:

the input data based on the guide data to provide filtered data, the filtered data indicative of the piecewise smoothing of the input data, and the certainty function based on the guide data to provide filtered certainty, the filtered certainty indicative of piecewise smoothing of the certainty function;

applying, by the processor, a normalized convolution technique to the filtered data and the filtered certainty to generate output data indicative of a piecewise smooth regularization of the input data; and provide, by the processor, the output data, the output data being a final flow analysis of the first frame.

7. The method of claim 6, wherein the input data function to be is optimized based on the input data.

8. The method of claim 7, wherein the normalized convolution technique is applied based on an applicability for the input data, the applicability function indicative of how the input data function may be interpolated.

9. The method of claim 7, wherein the input data function is a multivariate function to be optimized under a piecewise smooth constraint, and the certainty function is a scalar field acting on each data element in the dataset.

10. The method of claim 6, wherein the input data is an image, and the data point is a pixel, and the certainty function is an image representation of certainty of each pixel of the image.

11. A non-transitory computer readable medium comprising instructions executable by a processor to:

perform an optical flow technique on a first image frame of video data and a second image frame successive to the first image frame within the video data to generate an initial flow analysis associated with a certainty function indicative of a confidence of the initial flow analysis for each data element of the first frame and with an input data function representing a velocity vector of each pixel in an optical flow;

identify guide data, wherein the guide data includes information indicative of piecewise smoothness of the input data, the guide data identified as the first image frame;

apply a joint edge-aware filter to the input data based on the guide data to provide filtered data;

apply a joint edge-aware filter to the certainty function based on the guide data to provide filtered certainty;

identify an applicability function for the input data, the applicability function indicative of how the input data function may be interpolated; and apply a normalized convolution technique, based on the applicability function, to the filtered data and the filtered certainty to generate output data indicative of a piecewise smooth regularization of the input data, the output data being a final flow analysis of the first image frame.

12. The non-transitory computer readable medium of claim 11, wherein the input data function is a multivariate function to be optimized under a piecewise smooth constraint, and the certainty function is a scalar field acting on each data element in the dataset.

* * * * *